United States Patent
Kuzuya et al.

(10) Patent No.: US 10,422,432 B2
(45) Date of Patent: Sep. 24, 2019

(54) SAFETY VALVE

(71) Applicant: RINNAI CORPORATION, Nagoya-shi, Aichi (JP)

(72) Inventors: Kotaro Kuzuya, Aichi (JP); Yuichi Hayashi, Aichi (JP)

(73) Assignee: RINNAI CORPORATION, Nagoya-Shi (JP)

( * ) Notice: Subject to any disclaimer, the term of this patent is extended or adjusted under 35 U.S.C. 154(b) by 0 days.

(21) Appl. No.: 15/760,409

(22) PCT Filed: Sep. 8, 2016

(86) PCT No.: PCT/JP2016/076451
§ 371 (c)(1),
(2) Date: Mar. 15, 2018

(87) PCT Pub. No.: WO2017/064952
PCT Pub. Date: Apr. 20, 2017

(65) Prior Publication Data
US 2018/0252319 A1 Sep. 6, 2018

(30) Foreign Application Priority Data
Oct. 15, 2015 (JP) .................................. 2015-203975

(51) Int. Cl.
F16K 1/44 (2006.01)
F16K 31/04 (2006.01)
(Continued)

(52) U.S. Cl.
CPC ................ *F16K 1/44* (2013.01); *F16K 1/443* (2013.01); *F16K 31/04* (2013.01); *F16K 31/047* (2013.01);
(Continued)

(58) Field of Classification Search
CPC ........ F16K 1/44; F16K 31/0655; F16K 31/06; F16K 31/04; F16K 1/443; F16K 31/0644;
(Continued)

(56) References Cited

U.S. PATENT DOCUMENTS 6,814,102 B2 * 11/2004 Hess ......................... F16K 1/44
137/315.09
6,886,597 B2 * 5/2005 Dragoni .................... F16K 1/44
137/625.33
(Continued)

FOREIGN PATENT DOCUMENTS

DE 103 06 003 8/2003
JP 2008-157280 7/2008
(Continued)

OTHER PUBLICATIONS

International Search Report, dated Nov. 22, 2016 (Nov. 22, 2016), 1 page.
European Search Report dated Apr. 25, 2019, 8 pages.

*Primary Examiner* — Michael R Reid
(74) *Attorney, Agent, or Firm* — Rankin, Hill & Clark LLP

(57) ABSTRACT

Provided is a safety valve that can be satisfactorily closed. A safety valve includes a first valve port (13) and a first valve body (4) that are provided in a gas flow channel. The safety valve further includes an attracting part (3) that attracts the first valve body (4) by magnetic force. The safety valve further includes an electric drive mechanism (2) that moves the attracting part (3). The safety valve further includes a second valve port (14) and a second valve body (34) that are provided upstream of the first valve port (13). The second valve body (34) is provided on the attracting part.

5 Claims, 4 Drawing Sheets

(51) Int. Cl.
  *F16K 31/06* (2006.01)
  *F23K 5/00* (2006.01)
  *F23N 5/24* (2006.01)

(52) U.S. Cl.
  CPC .......... *F16K 31/0655* (2013.01); *F23K 5/002* (2013.01); *F23K 5/007* (2013.01); *F23N 5/245* (2013.01); *F23K 2900/05001* (2013.01); *F23N 2035/14* (2013.01); *F23N 2039/04* (2013.01)

(58) Field of Classification Search
  CPC ........ F16K 31/0648; F23K 5/00; F23K 5/007; Y10T 137/88038
  USPC .................................................. 137/614.18
  See application file for complete search history.

(56) References Cited

U.S. PATENT DOCUMENTS

2002/0189693 A1   12/2002   Berto
2005/0166979 A1    8/2005   Berger et al.

FOREIGN PATENT DOCUMENTS

| JP | 2009-139009 | 6/2009 |
| JP | 2011-196416 | 10/2011 |
| WO | 2006/032787 | 3/2006 |

\* cited by examiner

SAFETY VALVE

TECHNICAL FIELD

The present invention relates to a safety valve provided on an upstream end side of a gas supply pipe of a gas appliance.

BACKGROUND ART

A known safety valve of this type includes a main body having a gas channel and a valve port formed at a downstream end thereof, a valve body biased in the direction to close the valve port, an attracting part that attracts the valve body by an electromagnetic force, and an electric drive mechanism such as a motor that makes the attracting part move back and forth in the valve closing direction and the valve opening direction (for example, see Patent Literature 1).

With this safety valve, the electric drive mechanism is energized and activated to move the attracting part in the valve closing direction until the attracting part abuts against the valve body, and then, in a state where the valve body is attracted to the attracting part producing magnetic force, the electric drive mechanism moves the attracting part back in the valve opening direction to open the gas channel. If the magnetic force of the attracting part attracting the valve body is maintained by supplying electric power to the safety valve, the gas channel is kept open.

When the energization of the safety valve is stopped, the magnetic force of the attracting part disappears, and the safety valve becomes the closed-state by the biasing force applied to the valve body.

CITATION LIST

Patent Literature

Patent Literature 1: Japanese Patent Laid-Open No. 2009-139009

SUMMARY OF INVENTION

Technical Problem

The conventional safety valve described above has a problem, for example, that the valve can be insufficiently closed if a foreign matter such as a waste is clogged between the valve body and the valve port.

In view of the problem described above, an object of the present invention is to provide a safety valve that can be satisfactorily closed.

Solution to Problem

The present invention provides a safety valve comprising:
a first valve port which is formed in a gas flow channel in a hollow main body;
a first valve body that opens and closes the first valve port;
a first valve body biasing member that biases the first valve body in a direction to close the first valve port;
an attracting part that is provided movably in directions in which the first valve body opens and closes the first valve port, and attracts the first valve body by electromagnetic force against biasing force of the first valve body biasing member; and
an electric drive mechanism that drives the attracting part to move, and
the safety valve further comprises:
a second valve port that is located along the gas flow channel at a position upstream of the first valve port, and is shaped to surround the first valve port; and
a second valve body that is provided on the attracting part, and opens and closes the second valve port by a movement of the attracting part.

According to the present invention, when the first valve body closes the first valve port, the second valve body can close the second valve port. Therefore, even if any one of the valve bodies insufficiently closes the corresponding valve port because of clogging with a foreign matter or the like, the other valve body can close the corresponding valve port.

Furthermore, according to the present invention, it is preferable that the safety valve further comprises a second valve body biasing member that biases the second valve body in a direction to close the second valve port, and the second valve body biasing member biases the second valve body to close the second valve port when electric supply to the electric drive mechanism is stopped.

When electric supply to the attracting part is stopped, the first valve body biased by the first valve body biasing member closes the first valve port. Similarly, when electric supply to the electric drive mechanism is stopped, the second valve body biased by the second valve body biasing member also closes the second valve port. Therefore, since electric supply of both of the attracting part and the electric drive mechanism is stopped when a power outage occurs, both the valve bodies close the corresponding valve ports, so that the safety valve can be closed with reliability.

According to the present invention, the first valve body preferably comprises a flow rate control part that controls the flow rate of gas passing through the first valve port in accordance with increase or decrease of a degree of insertion of the flow rate control part into the first valve port. Thus, the function as a flow control valve is added to the safety valve, gas passing through the safety valve can be supplied to the downstream side by controlling the flow rate of the gas to a desired level.

According to the present invention, a connector that connects a harness to the electric drive mechanism and a connector that connects a harness to the attracting part are preferably integrally formed. Thus, the space occupied by the connector can be minimized, and the safety valve can be prevented from being bulky.

According to the present invention, when the second valve port is closed by the second valve body, and also electric supply to the attracting part is stopped, the first valve body preferably closes the first valve port in a state same as a state when the first valve body is attracted by the attracting part. Thus, the electric power required when the attracting part attracts the first valve body (that is, when the first valve body opens the corresponding valve port) can be reduced.

DESCRIPTION OF EMBODIMENTS

Figure 1:
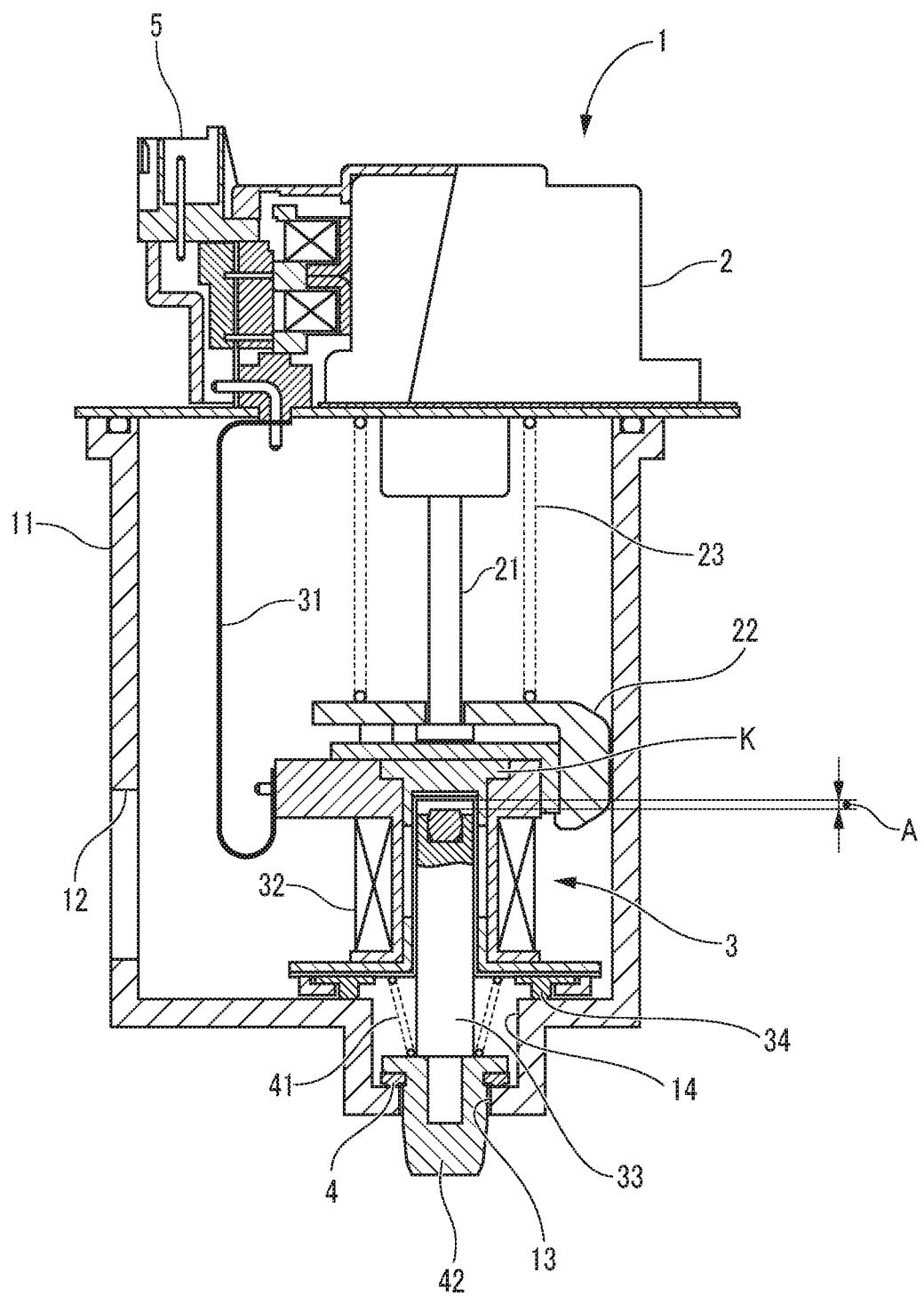
FIG. 1 is a diagram showing a valve according to a first embodiment of the present invention in a closed state.

Referring to FIG. 1, reference numeral 1 denotes an example of a safety valve. The safety valve 1 is incorporated in a gas appliance and, although not shown, is attached to a gas supply channel for supplying gas to a gas burner at a middle part thereof. FIG. 1 shows a state where the safety valve 1 is closed.

A main body 11 of the safety valve 1 is hollow and comprises an inlet port through which gas flows into the main body 11 from the outside, and a first valve port 13, through which the gas flows out of the main body 11. Thus, a gas flow path is formed from the inlet port 12 to the first valve port 13 in the main body 11 of the safety valve 1.

A motor 2, which is an electric drive mechanism, is supported on a top part of the main body 11 of the safety valve 1. The motor 2 makes a shall 21 move upward and downward. In the state shown in FIG. 1, the shaft 21 is located at a lowermost position thereof. The shaft 21 is moved upward by the motor 2 when the valve is opened as described later.

A bracket 22 is coupled to a lower end of the shaft 21. A solenoid 3, which is an attracting part, is coupled to the bracket 22. Therefore, when the shaft 21 moves upward or downward, the solenoid 3 moves upward or downward in association with the shaft 21. A second valve body 34 is attached to a lower part of the solenoid 3, and the second valve body 34 opens and closes a second valve port 14. Reference numeral 32 denotes a solenoid coil.

The bracket 22 is biased downward by a spring 23 (second valve body biasing member). The biasing force of the spring 23 is imparted to the second valve 34 via the bracket 22.

The solenoid 3 is provided with a plunger 33. A first valve body 4 is attached to a lower end of the plunger 33. The first valve body 4 is to open and close the first valve port 13, and is biased downward by a spring 41 (first valve body biasing member).

The first valve body 4 is provided with a flow rate control part 42 that protrudes downward. The flow rate control part 42 is inserted in the first valve port 13 when the first valve port 13 is closed by the first valve body 4.

To open the safety valve 1 from the state shown in FIG. 1, the solenoid coil 32 is energized through a conductor wire 31 to lift the plunger 33 upward. As a result, the first valve body 4 moves upward against the biasing force of the spring 41 to open the first valve port 13. At this time, the bracket 22 has not moved upward yet, the second valve port 14 is kept closed by the second valve body 34, and the gas in the main body 11 does not flows to the outside through the first valve port 13.

Figure 2:
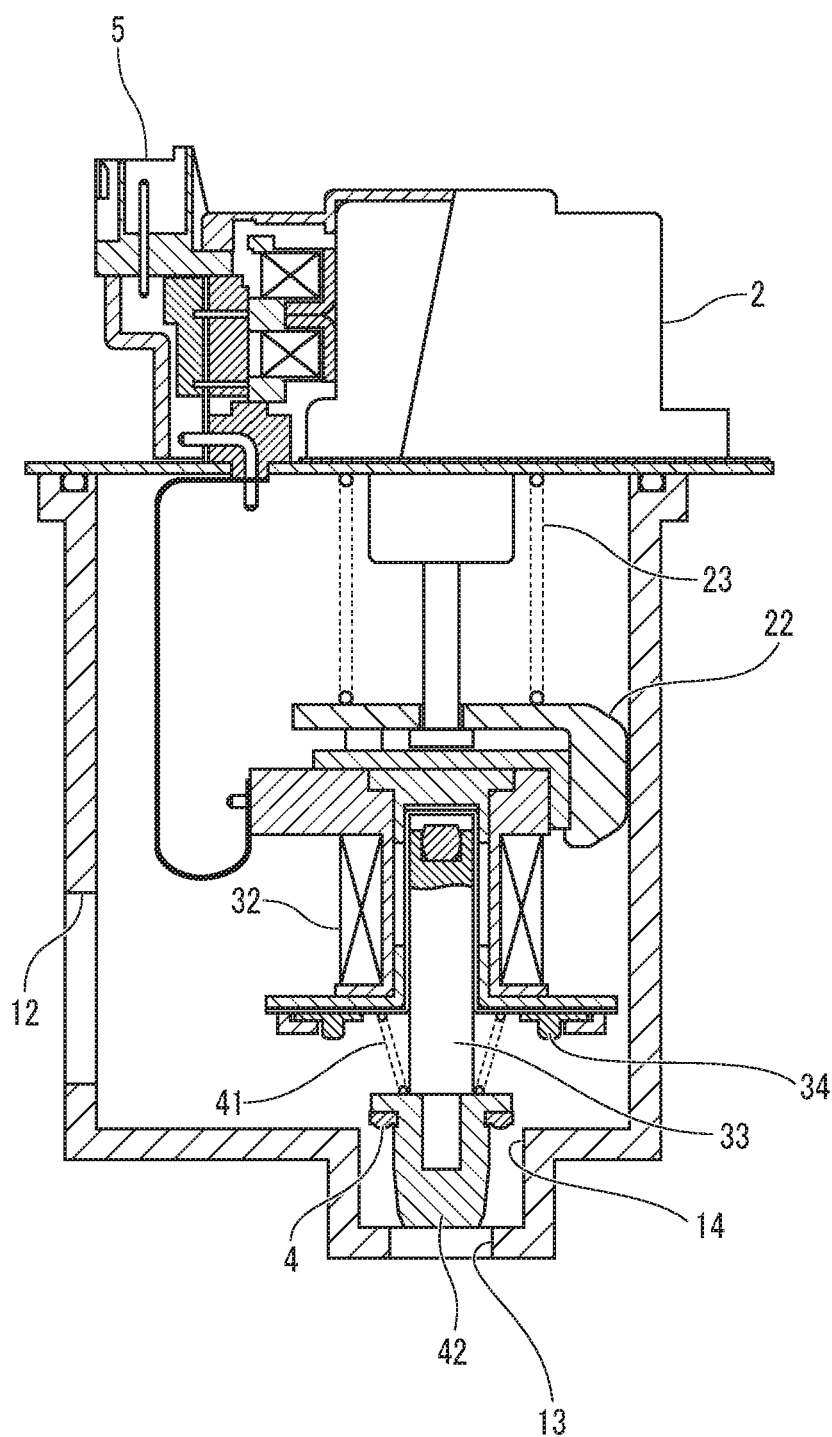
FIG. 2 is a diagram showing the valve according to the first embodiment in an open state.

Then, as the motor 2 is activated and makes the shaft 21 and the bracket 22 move upward, the second valve body 34 opens the second valve port 14 as shown in FIG. 2. As a result, the gas in the main body 11 starts flooring to the outside through the first valve port 13.

However, for some time after the second valve port 14 starts being opened, the flow rate control part 42 remains inserted in the first valve port 13, so that the opening of the first valve port 13 is narrow, and the flow rate of the gas flowing to the outside is small. As the bracket 22 further moves upward, and the first valve port 13 becomes fully opened as shown in FIG. 2, the flow rate control part 42 is drawn from the first valve port 13, and the opening of the first valve port 13 gradually increases. The flow rate of the gas flowing to the outside increases accordingly.

To close the safety valve 1 from the state shown in FIG. 2, the motor 2 is activated in the reverse direction to make the shaft 21 move downward. The second valve body 34 first closes the second valve port 14. Then, energization of the solenoid coil 32 is stopped so that the first valve body 4 closes the first valve port 13 under the biasing force of the spring 41.

However, if energization of the solenoid coil 32 is stopped when a power outage occurs with the first valve port 13 fully opened as shown in FIG. 2 or when a misfire of the gas burner is detected, the first valve body 4 immediately moves downward under the biasing force of the spring 41 to close the first valve port 13. After that, the bracket 22 moves downward under the biasing force of the spring 23, and the second valve body 34 closes the second valve port 14.

As shown in FIG. 1, there is an attraction stroke A between a fixed iron core K and an upper end of the plunger 33 in the state where the second valve port 14 is closed by the second valve body 34. Therefore, the second valve body 34 can move downward after the first valve body 4 closes the first valve port 13, so that the second valve body 34 can close the second valve port 14 with reliability.

In the first embodiment shown in FIGS. 1 and 2, to open the safety valve 1 from the closed state shown in FIG. 1, the solenoid coil 32 is energized to lift the plunger 33 against the biasing force of the spring 41. Therefore, to open the safety valve 1, a relatively high electric power needs to be supplied to the solenoid coil 32.

A safety valve that can minimize the electric power required for valve opening will be described below with reference to FIG. 3.

Figure 3:
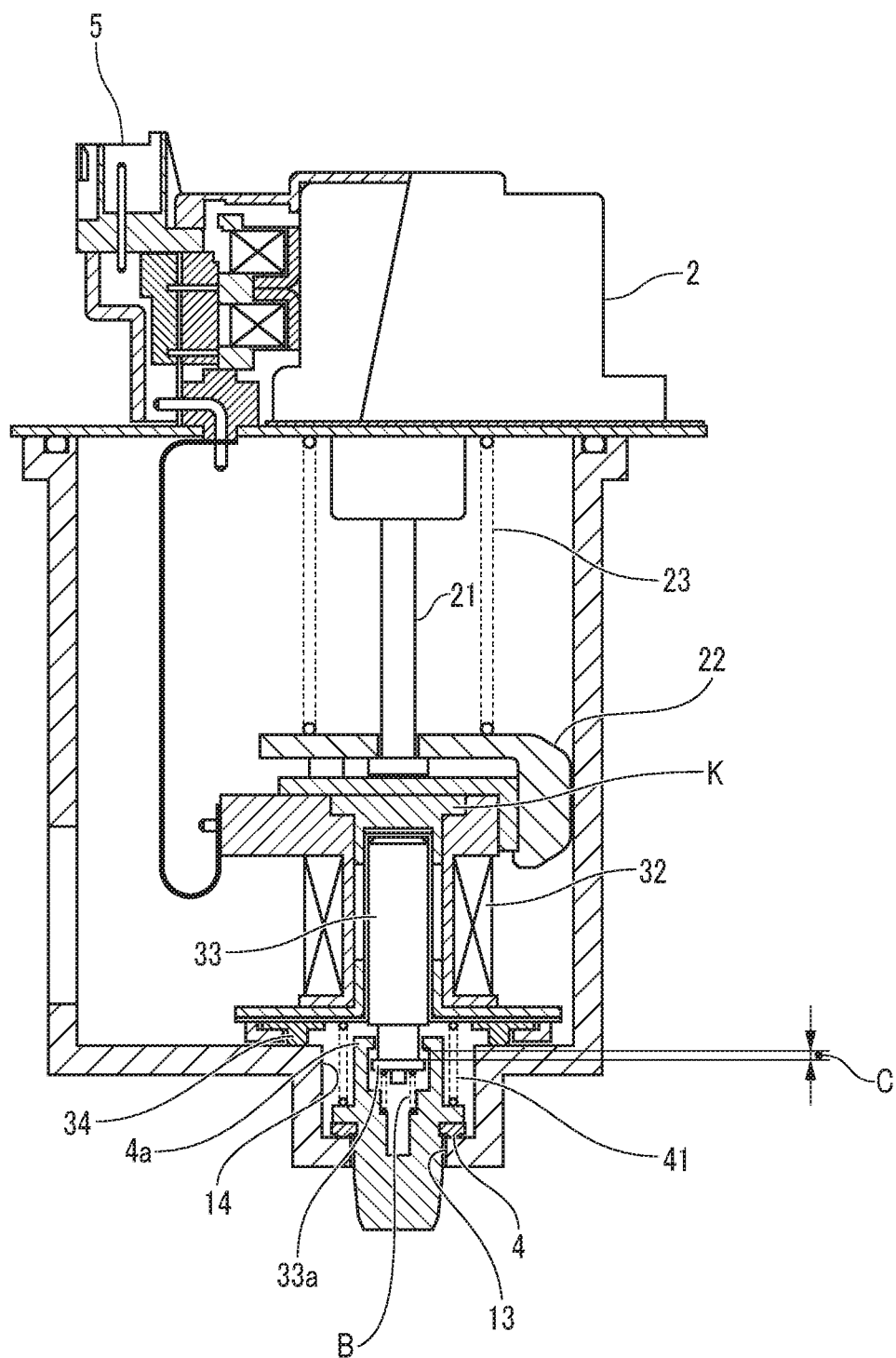
FIG. 3 is a diagram showing a valve according to a second embodiment in a closed state.

The safety valve shown in FIG. 3 has basically the same structure as the safety valve shown in FIGS. 1 and 2, except that the first valve body 4 and the plunger 33 are not constantly linked to each other, and the first valve body 4 is not lifted even if the plunger 33 moves upward until an engagement part 33a formed at a tip end of the plunger 33 is engaged with an engagement part 4a provided on the side of the first valve body 4.

In the closed state shown in FIG. 3, the plunger 33 is in the same state as when the plunger 33 is lifted by the magnetic force produced by the solenoid coil 32. Therefore, the amount of electric power required to lift the plunger 33 does not need to be supplied to the solenoid coil 32, and an amount of electric power required to maintain the state shown in FIG. 3 suffices.

Thus, to open the safety valve 1 from the state shown in FIG. 3, the solenoid coil 32 is first energized to maintain the plunger 33 in the state shown in the drawing, and the motor 2 is then activated to make the bracket 22 move upward, thereby lifting the second valve body 34 to open the second valve port 14.

At this time, however, the first valve port 13 is still closed by the first valve body 4. The plunger 33 then moves upward along with the bracket 22, and once the engagement part 33a at the tip end of the plunger 33 is engaged with the engagement part 4a provided on the side of the first valve part 4, the first valve body 4 moves upward along with the plunger 33 to open the first valve port 14.

On the other hand, the first valve port 13 and the second valve port 14 are closed from the fully open state as follows. In this state, the first valve body 4 protrudes downward by the action of the spring 41. Therefore, when the motor 2 is activated to make the bracket 22 move downward, the first valve body 4 first closes the first valve port 13, and as the bracket 22 further moves downward, the second valve body 34 closes the second valve port 14 while compressing the spring 41.

In the closed state shown in FIG. 3, there is a clearance C between the engagement part 4a provided on the side of the first valve body 4 and the engagement part 33a at the tip end of the plunger 33. The clearance C allows the second valve body 34 to further move downward after the first valve body 4 first closes the first valve port 13 to ensure that the second valve port 14 is closed with reliability.

In addition, in the closed state, the upper end of the plunger 33 is pressed against the fixed iron core K by a cushion spring B. Therefore, when the solenoid coil 32 is energized to open the safety valve 1, the plunger 33 does not move upward but is attracted and maintained in position.

With the configuration shown in FIG. 3, if energization of the solenoid coil 32 is stopped when a power outage occurs with the safety valve 1 open or when a misfire of the gas burner is detected, the plunger 33 closes first valve port 13 under the biasing force of the spring 41, and then the second valve body 34 closes the second valve port 14 under the biasing force of the spring 23, as with the configuration according to the first embodiment described above.

Figure 4:
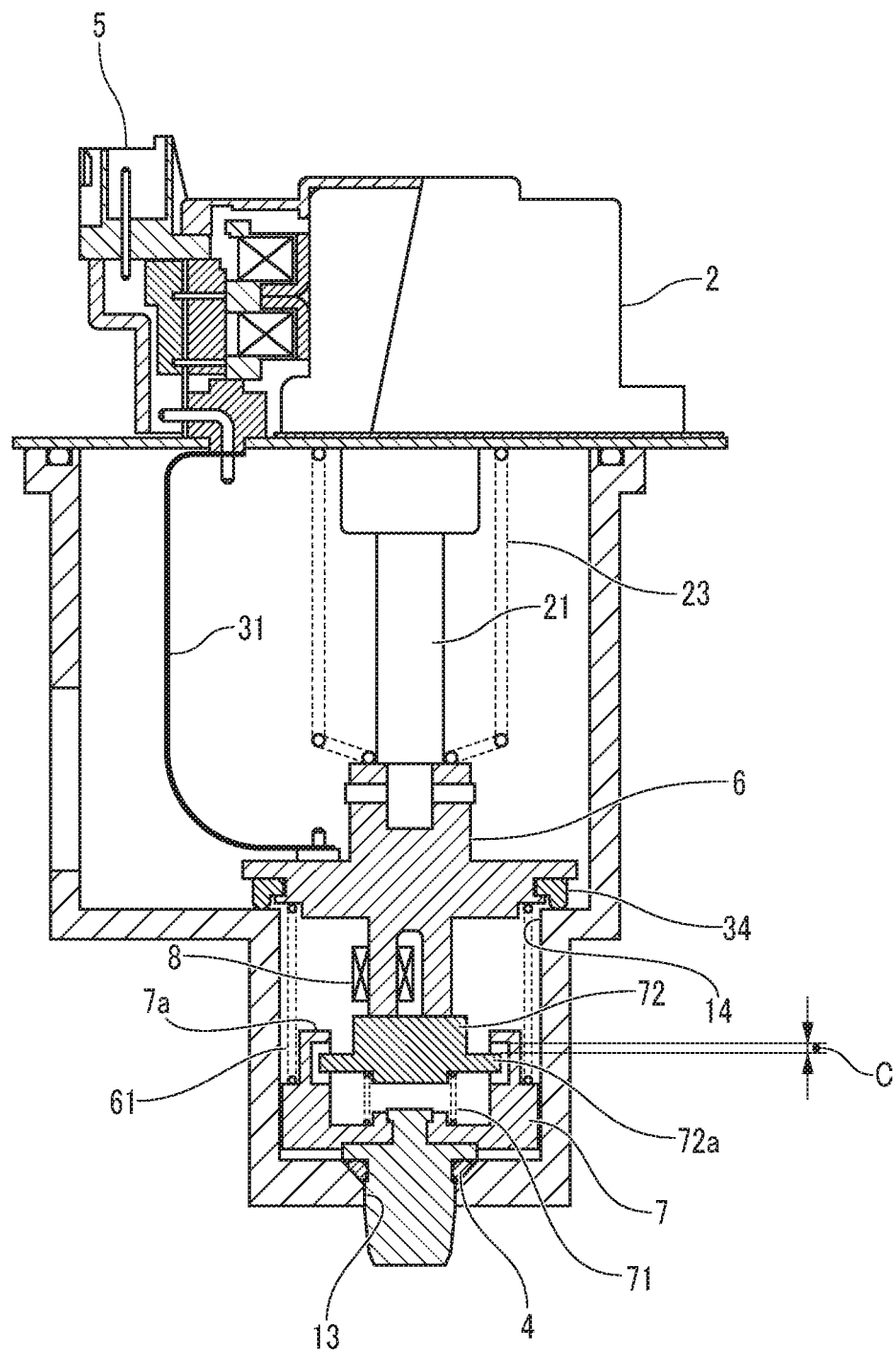
FIG. 4 is a diagram showing a valve according to a third embodiment in a closed state.

The configuration for minimizing the electric power required for valve opening is not limited to that shown in FIG. 3, and the configuration shown in FIG. 4 is also possible, for example.

In the configuration shown in FIG. 4, an electromagnet 8 is arranged above a magnetic member 72. The magnetic member 72 is opposed to a holder 7 that holds the first valve body 4 with a cushion spring 71 interposed therebetween, and an engagement part 72a of the magnetic member 72 and an engagement part 7a of the holder 7 are configured so as to be engaged with each other.

In the closed state shown in FIG. 4, the magnetic force of the electromagnet 8 pushes the magnetic member 72 downward against the biasing force of the cushion spring 71, and the magnetic pole of the electromagnet 8 abuts against the magnetic member 72 even when the electromagnet 8 is not energized. To open the safety valve 1, the electromagnet 8 is energized to make the magnetic pole of the electromagnet 8 attract the magnetic member 72.

When the motor 2 is activated to move a bracket 6 upward, the second valve body 34 first opens the second valve port 14, and the first valve body 4 then opens the first valve port 13, as with the configuration shown in FIG. 3 described above.

If energization of the electromagnet 8 is stopped when a power outage occurs with the safety valve 1 open or when a misfire of the gas burner is detected, the first valve body 4 moves downward along with the holder 7 under the biasing force of the spring 61 to close the first valve port 13, and then the second valve body 34 closes the second valve port 14 under the biasing force of the spring 23.

In addition, as with the configuration shown in FIG. 3, there is a clearance C between the engagement part 72a of the magnetic member 72 and the engagement part 7a of the holder 7, so that the second valve body 34 can close the second valve port 14 with reliability.

In all of the first to third embodiments described above, a harness for input of an activation signal to the motor 2 and a harness for energization of the solenoid coil 32 or electromagnet 8 need to be provided. Although the safety valve 1 usually comprises a separate connector for each of the two harnesses, a single integrated connector 5 serving as both the two connectors is used in these embodiments.

The present invention is not limited to the embodiments described above, and various modifications can be made without departing from the spirit of the present invention.

INDUSTRIAL APPLICABILITY

As described above, the present invention can provide a safety valve that can be satisfactorily closed in which the attracting part that attracts the first valve body by an electromagnetic force is provided with the second valve body, and both the valve bodies can close the respective valve ports at the same time.

The invention claimed is:

1. A safety valve, comprising:
    a first valve port that which is formed in a gas flow channel in a hollow main body;
    a first valve body that opens and closes the first valve port;
    a first valve body biasing member that biases the first valve body in a direction to close the first valve port;
    an attracting part that is provided movable in a direction in which the first valve body opens and closes the first valve port, and attracts the first valve body by electromagnetic force against a biasing force of the first valve body biasing member; and
    an electric drive mechanism that drives the attracting part to move,
    wherein the safety valve further comprises:
    a second valve port that is located along the gas flow channel at a position upstream of the first valve port, and is shaped to surround the first valve port; and
    a second valve body that is provided on the attracting part, and opens and closes the second valve port by a movement of the attracting part.

2. The safety valve according to claim 1, further comprising:
    a second valve body biasing member that biases the second valve body in a direction to close the second valve port,
    wherein the second valve body biasing member biases the second valve body to close the second valve port when electric supply to the electric drive mechanism is stopped.

3. The safety valve according to claim 1, wherein the first valve body comprises a flow rate control part that controls the flow rate of gas passing through the first valve port in accordance with an increase or decrease of a degree of insertion of the flow rate control part into the first valve port.

4. The safety valve according to claim 1, wherein a connector that connects a harness to the electric drive mechanism and a connector that connects a harness to the attracting part are integrally formed.

5. The safety valve according to claim 1, wherein when the second valve port is closed by the second valve body, and also electric supply to the attracting part is stopped, the first valve body closes the first valve port in a state same as a state when the first valve body is attracted by the attracting part.

* * * * *